| (12) | United States Patent<br>Penterman et al. | (10) Patent No.: US 6,788,360 B2<br>(45) Date of Patent: Sep. 7, 2004 |
|---|---|---|

(54) STACKED LIQUID CELL WITH LIQUID-POLYMER STRATIFIED PHASE SEPARATED COMPOSITE

(75) Inventors: Roel Penterman, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/203,577

(22) PCT Filed: Dec. 12, 2001

(86) PCT No.: PCT/IB01/02514
§ 371 (c)(1),
(2), (4) Date: Aug. 9, 2002

(87) PCT Pub. No.: WO02/48783
PCT Pub. Date: Jun. 20, 2002

(65) Prior Publication Data
US 2002/0196390 A1 Dec. 26, 2002

(51) Int. Cl.⁷ ............................................. G02F 1/1347
(52) U.S. Cl. ............................. 349/74; 349/92; 349/93; 349/158; 349/183
(58) Field of Search ..................... 349/74–83, 86, 349/88, 92, 93, 158, 183

(56) References Cited
U.S. PATENT DOCUMENTS
5,949,508 A   9/1999   Kumar et al. ............... 349/122

2003/0038912 A1   2/2003   Broer et al.

FOREIGN PATENT DOCUMENTS

| EP | 1065553 A1 | 1/2001 | ......... G02F/1/1333 |
| WO | WO9947967 | 9/1999 | ......... G02F/1/1333 |

Primary Examiner—Robert H. Kim
Assistant Examiner—Andrew Schechter

(57) ABSTRACT

A stacked liquid cell, such as a stacked liquid crystal cell, comprises a stack of liquid layers and substrate layers between which the liquid layers are dispersed. The stack comprises a liquid and polymeric substrate layers made from a stratified-phase-separated composite. Being part of a stratified-phase-separated composite, in particular one manufactured in accordance with a single-substrate method, the polymeric layer may have a relative small thickness compared a conventional substrate layer which results in a stacked liquid cell having a reduced thickness or, more particular, a stacked liquid cell having a reduced thickness between subjacent liquid layers giving a reduction in parallax effects.

A method of manufacturing a liquid cell involves stratifying, on a substrate, a layer of stratified-phase-separable composition into a liquid layer and a polymeric layer to form a stratified-phase-separated composite, the polymeric layer serving as one of the substrate of the liquid cell.

19 Claims, 3 Drawing Sheets

STACKED LIQUID CELL WITH LIQUID-POLYMER STRATIFIED PHASE SEPARATED COMPOSITE

The invention relates to a stacked liquid cell, such as a stacked liquid crystal cell for use in a stacked display device, in particular a liquid crystal display device.

The invention further relates to a method of manufacturing a liquid cell, in particular a stacked liquid cell.

Stacked liquid cells, in particular stacked liquid crystal cells, and displays comprising such cells are as such known in the art. A stacked liquid cell generally comprises a plurality of cells (sub-cells) stacked one on top of the other. Each (sub-)cell comprises a liquid layer dispersed between substrate layers which serve to separate and confine the liquid layers during use and/or manufacture. The sub-cells together form a stack of liquid layers dispersed between substrate liquid layers, in which substrate layers may be shared between (sub-)cells. In a stacked liquid crystal cell at least one but typically all liquid layers are electro-optically active liquid crystal layers.

Such stacked LC cells may have advantages compared to single liquid layer devices. For example, in multi-color or full color display devices use of a stacked liquid cell may increase the active display area available per color by as much as a factor of three. A cholesteric display having a stack of cholesteric liquid crystal layers the pitch of which is selected such that R G and B is reflected in different layers is an exmaple. As another example, a first liquid layer may be a liquid crystal layer and a second liquid layer may serve as a temperature compensated compensation layer for the first liquid crystal layer.

However, on the down side, stacked liquid crystal cells are relatively thick and the distance between the liquid layers is relatively large. Such a large thickness is generally undesirable. Furthermore, in stacked liquid cells where the liquid layers are partitioned to form individually addressable pixels the large thickness may lead to substantial parallax effects. The thickness of the stacked liquid cell and the distance between the liquid layers is, to a large extent, caused by the relatively thick substrates between which the liquid layers are dispersed.

It is an object of the invention, inter alia, to alleviate these drawbacks and provide a stacked liquid cell having a relatively small thickness. More in particular, for example in case of a pixelated stacked display cell, the stacked liquid cell is to have a structure which allows parallax effects to be reduced. Furthermore, the stacked liquid cell is to allow facile and cost effective manufacture. In particular, the stacked liquid cell, or at least a substantial part thereof, is to be such as to be capable of being manufactured in a continuous process, or even a roll-to-roll process.

This object is, in accordance with the invention, achieved by a stacked liquid cell comprising a stack of liquid layers and substrate layers, wherein each liquid layer is dispersed between substrate layers, and wherein a liquid layer and a substrate layer adjacent thereto are replaced with a liquid layer and a polymeric layer of a stratified-phase-separated composite.

The stacked liquid cell comprises a stack of liquid layers and substrate layers, the liquid layers being dispersed between the substrate layers. In accordance with the invention, at least one liquid layer and adjacent substrate layer are replaced with a liquid layer and a polymeric layer of a stratified-phase-separated composite.

A stratified-phase-separated composite is obtainable by stratification of a stratified-phase-separable composition into a polymeric layer and a liquid layer. The polymeric layer and the liquid layer are separate, continuous layers arranged adjacent to each other sharing a common interface, the interface being sufficiently smooth to render the composite suitable for optical applications such as displays. The stratification is a controlled form of phase separation, more particularly referred to as stratified-phase-separation.

Conventional substrate layers have a thickness in the millimeter range, that is at least a thickness of 0.2 to 0.5 mm, typically even larger to ease handling. Conventional substrates need to have such a minimum thickness because of the manner conventional (stacked) cells are manufactured. Conventionally, a cell is manufactured by gluing together along their edges two opposite substrate layers to form an empty cell which is then filled with liquid to form the liquid cell. Such a method generally requires both substrate layers to be self-supporting. Moreover, if a constant liquid layer thickness is to attained throughout the cell the substrate layers need to be sufficiently rigid which also adds to the thickness.

Because the layer from which the stratified-phase-separated composite is obtained may be formed using conventional thin film forming methods, and the polymeric layer of the stratified-phase-separated composite is formed in situ—at the same time as the liquid layer—, a thin stratified-phase-separated composite, more particular a thin, at least relative to the thickness of a conventional substrate layer, polymeric layer can be made in an easy and cost effective manner.

The thickness of the polymeric layer is in the micrometer range. Typically, the thickness of the polymeric layer may be less than about 100, 50, 20 or 10 $\mu$m. Using conventional thin film forming methods, in particular coating and printing methods such as spin-coating, web-coating, ink-jet printing screen printing and the like, even thinner polymeric layers are readily available such as those having a thickness in the range 0.1 to 10 $\mu$m.

Therefore, in accordance with the invention, replacing a conventional substrate layer with a polymeric layer of a stratified-phase-separated composite reduces the thickness of the stacked liquid cell and, if the polymeric substrate layer is an interior layer of the stack the distance between liquid layers is reduced which, in turn reduces parallax. Parallax is of particular importance in non-emissive optical applications such as displays.

From the viewpoint of reducing thickness and parallax effects, the thickness of the polymeric layer is to be as small as possible. However, being a substrate layer the polymeric layer needs to provide the required support, ruggedness and mechanical integrity. It may need to serve as a substrate for the stacking of further layers such as a further stratified-phase-separated composite or the stacking of a conventional cell. Such requirements set a minimum on the polymeric layer, the specific value of which is to be determined on case-by-case basis. A minimum polymeric layer thickness would be typically 0.1 $\mu$m, or 0.5 $\mu$m or even larger 1 $\mu$m. If for example the polymeric layer is an exterior layer of the stack it needs to protect the stack during its operational lifetime which requires a larger, say 5 $\mu$m or more.

As will be described further hereinbelow in respect of the single substrate method, a stratified-phase-separated composite is obtainable by stratifying a stratified-phase-separable composition. Stratification is brought about by phase-separation. Suitable methods of phase-separation include polymerization-induced phase-separation, solvent-induced phase-separation or temperature-induced phase-separation such phase-separation methods being known in the art as such.

To obtain stratification, that is phase-separation in a stratified manner, use may be made of differential wetting. In one embodiment of differential wetting, the layer of stratified-phase-separable composition is provided on a substrate which has a better wettability for the liquid than for the polymer of the polymeric layer or the monomer(s) from which the polymer is obtained. In another, the stratified-phase-separable material is dispersed between a first and second substrate, the first substrate being well-wettable for the liquid and the second being well-wettable for the polymer/monomer from which the polymeric layer is obtained.

In an alternative method to obtain phase-separation in a stratified manner, a method which is preferably used in combination with differential wetting, the stratified-phase-separable material is photo-polymerizable and comprises a photo-polymerization dye which is capable of least partially absorbing the radiation used to photo-polymerize. Due to the dye a radiation intensity gradient is set up within a layer of stratified-phase-separable material which in turn leads to selective polymerization in areas of highest intensity which are typically the areas closest to the radiation source. The liquid may be selected to serve as a photo-polymerization dye or a separate dye may be added for this purpose. In a particular advantageous embodiment, the dye is selected to be reactive, or more particular co-polymerizable, with the polymer and/or monomers contained in the stratified-phase-separable material which results in selective accumulation of the dye in the polymeric layer.

Suitable stratified-phase-separable compositions comprise a polymer and a liquid, or in the case of a (photo-) polymerizable stratified-phase-separable composition a liquid and a (photo-)polymerizable monomer or mixture of such monomers. In optical applications, the liquid layer and/or polymeric layer is typically transparent, in particular to visible ligth. The amount liquid versus polymer is determined by the ratio of polymeric and liquid layer thickness required. Typically, the weight fraction of liquid may vary from 1 to 99 wt % or more particular, 2 to 98 wt %. Typically, at least 5 wt % liquid is used, or even more than 10 wt %. Preferably, to improve stratification, at least 25 wt % liquid is used.

Suitable polymerizable monomers and polymers include monomers for performing a polycondensation, such as monomers for obtaining a polyether, a polyester or a polyamide, monomer for performing a polyaddition, a ringopening reaction, a cycloaddition, a chain polymerization or a step polymerization and polymers obtained therefrom. Preferred are monomers for free-radical chain polymerization.

Examples of preferred monomers which may be in particular be used for polymerization-induced phase-separation include a thiol-ene system, an oxetane, epoxide, a vinylene, a vinylether, an acrylate, a methacrylate or a cinnamate monomer may be suitably used. With the exception of the cinnamate group which has a functionality of 1, the polymerizable group of the preferred monomers all have a functionality of 2 meaning that monomers having one polymerizable group, that is mono-(meth)acrylates, mono-epoxides, mono-vinylethers, mono-oxetane, mono-vinylenes, and dithiol di-ene systems, suffice to form a linear polymer. To obtain crosslinked polymers, monomers comprising two or more polymerizable groups each having a functionality of at least 2 may be used, such as di(meth) acrylates, di-vinlyethers, di-oxetanes, di-vinylenes, di-epoxides, or thiol-ene systems comprising trithiols or di-enes or di-enes provided with a mercapto group or ene-functionalized dithiols or higher homologues of such monomers, all of which are known in the art per se. Cross-linked cinnamates require monomers carrying at least three cinnamate groups. Particularly preferred are combinations of monomers having one polymerizable group and monomers having two or more polymerizable groups as they allow the degree of cross-linking to be freely selected.

The stratified-phase-separable material may comprise just one type of monomer to produce a homopolymer but generally it will contain more than one type to obtain copolymers, terpolymers or higher. The monomer may itself be a polymer also referred to as a prepolymer which is further polymerized and/or crosslinked to obtain the crosslinked polymer. Different non-co-polymerizable monomers may also be used to obtain a polymer blend which may or may not be phase-separated.

For further details and examples of stratified-phase-separated composites, methods of manufacturing such composites and stratified-phase-separable compositions from which such stratified-phase-separated composite are obtainable are reference is made to the EP patent application having application number 01204081.2 a companion patent application, viz. an international application entitled "Stratified phase-separated composite comprising a photo-polymerization dye" filed on the same day by Applicant (Applicant's reference PHNL010919) claiming priority of, inter alia, an European patent application having application number 00204529.2 and a further companion patent application, viz. an international application entitled "Stratified phase-separated composite having crosslinked polymeric layer."

filed on the same day by Applicant (Applicant's reference PHNL010920) also claiming priority of, inter alia, an European patent application having application number 00204529.2.

Further examples of suitable stratified-phase-separable compositions are disclosed in U.S. Pat. No. 5,949,508.

Combinations of monomers and liquid crystals which may be suitable candidates to be used for a stratified-phase-separable composition are compositions for obtaining a polymer dispersed liquid crystal. Compositions for obtaining polymer dispersed liquid crystals are amply described in the prior art.

It is generally found advantageous, for example for improving mechanical integrity, maintaining a constant liquid layer thickness and/or improving stratification, to provide a layer of a photo-polymerizable stratified-phase-separable composition and pattern-wise irradiate such layer to form supporting members which extend from the substrate to the polymeric layer upon stratification of the stratified-phase-separable composition further details of such supporting members being described in EP application having application number 01204081.2.

The liquids used to form the liquid layers of the stack including the liquid layers which are part of the stratified-phase-separated composite may be of any suitable form such a water-based or organic-solvent-based liquids, inks, dispersions, dyes, pastes, gels and the like. Each liquid layer may have the same composition or liquid layers having mutually different compositions may be used. In a particular embodiment, at least one of the liquid layers is a liquid crystal layer or, in an even more particular embodiment, all liquid layers are liquid crystal layers.

The liquid layer may have any desirable function. The liquid layer may have an optical, a mechanical, a chemical, an electrical, a magnetic or an electromagnetic function or any other passive function. In particular embodiments, the liquid layer may have an active function, meaning that the layer can be brought into states having different properties in response to an external stimulus such as radiation such as light, particle beams, mechanical stress, chemical reactions, electric and magnetic fields or currents. Of particular relevance are electro-optical liquid layers, that is layers having an optical function and layers of which the optical properties can be changed in response to an electric field. Preferred are electro-optical liquid crystal layers.

Different liquid layers and substrate layers of the stacked liquid cell may have the same function, effect or property (ies) or have different effects, functions and/or properties.

The liquid layers of a sub-set of the liquid layers of a stacked liquid cell in accordance with the invention may have mutually independent functions so as to provide a composite functionality. For example, a stacked liquid cell for use in a full color display has three separate liquid layers for displaying the primary colors red green and blue (RGB), the liquid layers are mutually independently addressable to attain the composite functionality of being capable to display the full color gamut.

Alternatively, the layers may interact to provide a particular function or effect. In particular, the function of a liquid layer may be to modify or enhance the effect or functionality of another layer, generally termed an auxiliary liquid layer. For example, a compensation layer may be combined with a liquid crystal layer to improve viewing angle dependency.

The substrate layers (excluding the polymeric layers of any stratified-phase-separated composite, examples of which have been provided hereinabove) may be of any material, organic, in particular polymeric or inorganic such as any type of glass, ceramic, metallic. Even a silicon substrate provided with an integrated circuit may be used.

The properties and material from which a substrate layer (including any polymeric layer of a stratified-phase-separated composite) is formed depend on the function of the stacked liquid cell and the position of that substrate layer in the cell. For example, in optical applications, interior substrate layers are typically transparent. Polymeric substrates are useful for obtaining rigid, flexible, bendable, foldable and/or wrappable, substrates.

The function of the substrate layer (including any polymeric layer of a stratified-phase-separated composite) is principally to support and separate the liquid layers of the stack. However, it may also be used to provide an auxiliary function with respect to a liquid layer of the stack such as a function mentioned hereinabove with respect to liquid layers having a passive function.

A substrate layer may be a single layer or may be itself a stack or laminate of sub-layers, such laminated substrate layer being of particular use if the substrate layer is to perform auxiliary functions or if the substrate layer separates two liquids which differ widely in properties such as a polar liquid and a relatively apolar liquid.

In case at least one of the liquid layers is an electro-optically active liquid layer, the stacked liquid cell is a stacked display cell or more particular a stacked liquid crystal display cell if the liquid layer is a liquid crystal layer. Examples of liquid-based display cells include electrophoretic displays and LC displays.

To avoid the substrate layers from collapsing on top of each other or keep a well-defined constant thickness of the liquid layer separating means (supporting means) may be used. Such separator means may be conventional spacers provided lithographically or by adding suitable formed spacer particles to the liquid. As mentioned hereinabove, in the case of a stratified-phase-separated composite, separator means (supporting means) may be provided by pattern-wise irradiating a layer of a photo-polymerizable stratified-phase-separable composition as explained in more detail in EP application having application number 01204081.2.

In a preferred embodiment, at least one of the liquid layers is an electro-optical liquid crystal layer.

The stacked liquid cell is then an electro-optical liquid cell or, if used to display, a stacked liquid crystal display cell. The stacked liquid cell in accordance with this embodiment comprises electro-optical liquid crystal material which can be switched between a first and a second oriented state by means of an electric field. To be able to use the optical effect in a display requires auxiliary layers such as electrode layers for supplying the field, alignment layers for anisotropically orientation of the liquid crystal layer, polarization layers to generate polarized light incident on the liquid crystal layer or to analyze polarized light reflected or transmitted by the liquid crystal layer, retardation layers also referred to as compensation layers, reflector layers and/or color filter layers. Such auxiliary layers, polarizer layers in particular may be arranged either in-cell that is between a liquid layer and adjacent substrate layer or outside the cell, that is arranged on a substrate layer side facing away from the liquid layer with which the auxiliary layer is intended to cooperate.

As far as the stacked liquid cell comprises conventional cells, conventional auxiliary layers and LC effects may be suitably combined with those cells. Details of combinations of auxiliary layers and a stratified-phase-separated composite as well as suitable LC effects are described in EP application having application number 01204081.2.

With respect to electrode arrangements, in case the stratified-phase-separated composite comprises an electro-optical liquid crystal layer, the stratified-phase-separated composite is preferably applied on a conventional substrate layer carrying an in-plane switching arrangement and the liquid crystal layer is capable of being switched by such an electrode arrangement.

The stacked liquid cell may comprise a single stratified-phase-separated composite combined with one or more conventional cells or may comprise several stratified-phase-separated composites optionally combined with one or more conventional cells or even all liquid layers may be provided by means of stratified-phase-separated composites.

In a preferred embodiment of a stacked liquid cell in accordance with the invention, the stack comprises adjacent stratified-phase-separated composites stacked such that the liquid and the polymeric layers alternate in sequence.

Stacking adjacent stratified-phase-separated composites in alternating sequence allows the polymeric layer of any such stratified-phase-separated composite to serve as a substrate for the provision of a further stratified-phase-separated composite. In principle, an unlimited number of stratified-phase-separated composite can thus be stacked on top of each other. Since for each such composite a reduction in thickness compared to a conventional cell is obtained a very thin stacked liquid cell results. If electrode layers are required to switch an electro-optical liquid layer, preferably an in-plane switching electrode arrangement is used. However, sandwich electrode arrangements may also be used.

In another preferred embodiment, the stack comprises adjacent stratified-phase-separated composites of which the polymeric layers are stacked back to back.

Stacking adjacent stratified-phase-separated composites with the polymeric layers back to back allows both the exterior substrate layers of the stack to be formed from conventional substrates. This provides the stack with a good mechanical stability and ruggedness. In addition, having conventional substrates on both exterior sides allows more electrode layers to be provided on such conventional substrates. This is advantageous as conventional substrates allow a wide range of electrode materials to be used, including indiumtinoxide (ITO).

The manufacture of a stack having back to back polymeric layers having conventional exterior substrates on both sides is simple. First of all, a first and a second stack each having at one exterior end a conventional substrate and at the other exterior end a polymeric layer of a stratified-phase-separated composite is provided. Then, the first and second stack are merged with the polymeric layers facing each other to form a stack having back to back polymer layers and a conventional substrate layer at each end.

The invention also relates to a method of manufacturing a liquid cell comprising a stratified-phase-separated composite.

A method of manufacturing a liquid cell comprising a stratified-phase-separated composite, also referred to as the double substrate method, resembles the conventional method of cell making and comprises forming an empty cell formed by gluing together along their edges, two conventional self-supporting substrates, and then filling the empty cell with stratified-phase-separable composition and bring about stratification of the stratified-phase-separable composition to form a stratified-phase-separated composite comprising a polymeric layer and a liquid layer. However, for use in the manufacture of a stacked cell this double substrate method is not preferred, because, in order the achieve the reduction in thickness the present invention aims for, the substrate situated adjacent the polymeric layer must be removed after stratification. This is generally difficult to do. Normally the opposite substrate comes off as the adhesion of the substrate to the polymeric layer is generally much better than the adhesion of the opposite substrate to the liquid layer.

A preferred method of manufacturing a liquid cell comprising a stratified-phase-separated composite comprising a polymeric layer and a liquid layer, in particular a method suitable for use in the manufacture of a stacked liquid cell comprises the steps of:
  providing a substrate;
  providing, on the substrate, a layer of a stratified-phase-separable composition; and
bringing about stratification of the thus formed layer of stratified-phase-separable composition to form the stratified-phase-separated composite comprising the polymeric layer and the liquid layer.

This method may be succesfully executed with just a single substrate, hence the method is also referred to as the single substrate method. The single substrate method is also described in European patent application having application number 00204529.2 in which the primary focus was on stratified-phase-separated composites comprising liquid crystal layers. However, the single substrate method is not limited to liquid crsytal layers. It may be suitably combined with any liquid. Examples of suitable liquids have been described hereinabove.

The single substrate method produces a liquid cell wherein the polymeric layer of the stratified-phase-separated composite takes the place of one of the cell's substrates. The liquid is present as a layer distinct and separate from the polymeric layer, is continuous throughout the cell and has a well defined thickness throughout the cell.

The single substrate method is a self-aligned method. The thickness of the liquid layer is determined by the amount of stratified-phase-separable material deposited per unit area. It is not necessary to use spacers to define the thickness desired. Thus the single method allows a liquid layer which is uniform in thickness to be prepared even if the substrate surface onto which the layer of stratified-phase-separable material is provided is bent or curved in accordance with a predetermined shape.

The single method is also attractive in that it allows the liquid layer and one substrate layer to be formed at the same time which reduces time of manufacture.

The single substrate method may be performed in a batch process but may also—in contrast to conventional liquid cell making—be readily applied in a continuous process, even for use in a roll-to-roll manufacturing method. The single substrate method is thus particularly suited to produce large area liquid cells.

The single substrate method is of particular use for the manufacture of a stacked liquid cell but the single substrate method and the liquid cell produced by the single substrate method has broader use. In a broad sense, the single substrate method may be used to manufacture any liquid layer containing product. In particular, the the method may be used to manufacture a liquid cell for holding liquid. More in particular, the single substrate method is suitable for obtaining liquid cells which are thin, for example having a thickness of about 0.5 mm to about 1 cm yet have a large surface area, for example a surface area of about 1 $cm^2$ to about 1 $m^2$ or more. The liquid contained in such a thin, large-area liquid cell is present in the form of a liquid layer typically having a thickness of about 0.1 $\mu$m to about 0.5 mm. If the liquid is selected to be polymerizable, the single substrate method in accordance with the invention may also be used for solid-state applications.

The single substrate method is an easier and more rapid method to manufacture such thin, large-area liquid cells than the conventional method of first providing an empty cell which is then filled with liquid.

The thickness of the stratified-phase-separated composite of the liquid cell obtained using the single substrate method can be anything between 1 and 500 $\mu$m, or better 2 to 150 $\mu$m, or still better 3 to 100 $\mu$m. A preferred range is 5 to 50 $\mu$m, or even more preferred 10 to 20 $\mu$m. Suitable liquids and polymers for use in the liquid and polymeric layers of the stratified-phase-separated composite and suitable thicknesses of such layers have been described hereinabove.

The stratified-phase-separable material may be formulated to have good film-forming properties and may be formulated to be applied using conventional wet film forming methods. In the context of the invention, the term film forming method refers to a coating or a printing method or the like. Suitable coating methods include but are not limited to painting, solvent casting, doctor-blading, wired rod coating, extrusion coating, die-slot coating, spin-coating, dip-coating, spray-coating, roll coating Langmuir-Blodgett, and web-coating. Suitable printing methods include but are not limited to ink-jet printing, silkscreen-printing, flexographic printing, offset printing and the like.

Suitable stratified-phase-separable materials for use in the method in accordance with the invention have been described and referred to hereinabove.

Those skilled in the art will appreciate that the single substrate method also comprises dispersing the layer of stratified-phase-separable composition between two substrates, but in that case, unlike the conventional method where the two substrates are glued together, the two substrates should not be attached to each other such that their relative position is fixed.

The substrate onto which the stratified-phase-separable composition is applied in the single substrate method may be a single substrate layer or may be a stack of substrate layers between which liquid layers are dispersed. In particular, the single substrate method may be repeated a number of times in succession, a next stratified-phase-separated composite being provided by applying stratified-phase-separable composition on the polymeric layer of a previous stratified-phase-separated composite.

Therefore, the single substrate method may be used in a method of manufacturing a stacked liquid cell comprising a stack of liquid layers and substrate layers, wherein each liquid layer is dispersed between substrate layers and wherein a liquid layer and an adjacent substrate layer are replaced with a liquid layer and a polymeric layer of a stratified-phase-separated composite, the method comprising:

providing the sub-stack or substrate layer situated on the liquid layer side of the stratified-phase-separated composite;

applying a layer of stratified-phase-separable composition on the sub-stack or substrate layer;

stratifying the stratified-phase-separable composition to form a stratified-phase-separated composite comprising a liquid layer and a polymeric layer, the liquid layer being formed on the substrate layer or sub-stack side; and providing, if any, the sub-stack or substrate layer situated on the polymeric layer side of the stratified-phase-separated composite.

In a particular embodiment of the method of manufacturing a stacked liquid cell, a conventional substrate is provided successively with a first and second stratified-phase-separated composite, the liquid and polymeric layers being stacked in alternating sequence.

In a further embodiment of the said method, the single conventional substrate is subsequently removed by separating the stacked liquid cell at the first liquid layer adjacent the substrate. Any remaining liquid is also removed to produce a liquid cell of a stratified-phase-separated composite comprising a liquid layer dispersed between a first and second polymeric layer, where both polymeric layers and the liquid layer is obtained by stratification. Such a liquid cell can be made extremely thin compared to conventional liquid cells as both substrate layers to hold the liquid are formed in situ and can thus be made much thinner than conventional substrates. After manufacture the first and second polymeric layer cooperate to provide a mechanically robust liquid cell. This is particularly so if the first and second polymeric layer are connected to each other by separating means of the type described hereinabove.

An alternative method to manufacture a stratified-phase-separated composite comprising a first and a second polymeric layer and, dispersed therebetween, a liquid layer, comprises providing a photo-polymerizable stratified-phase-separable composition comprising a photo-polymerization dye on a substrate and then irradiating the stratified-phase-separable composition on both sides such that a radiation intensity gradient is set up which has a radiation intensity which is at a minimum in the interior of the layer and becomes larger towards both sides of the layer.

These and other aspects will be elucidated in more detail in the embodiments presented hereinbelow.

PRIOR ART EMBODIMENT

Figure 1:
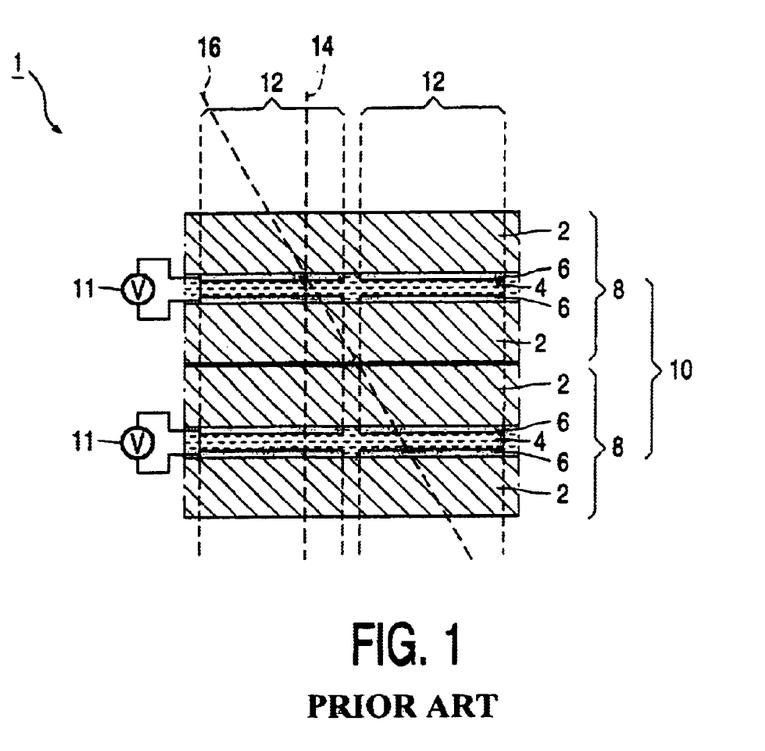
FIG. 1 shows, schematically, a cross-sectional view of a prior art stacked electro-optical liquid display cell.

FIG. 1 shows, schematically, a cross-sectional view of a prior art stacked display cell 1. Only layers relevant for understanding the problems associated with the prior art device are shown. The display cell could be an LC display but this is not essential, other fluid-based non-emissive displays could be used as well. The display cell 1 may be of any type such as a segmented, an active matrix or a passive matrix cell. The cell can be transmissive, reflective or transflective.

The display cell 1 comprises a stack 10 of substrate layers 2 and electro-optical liquid layers 4 dispersed therebetween. The substrate layers 2 are provided with electrodes 6 for operating the electro-optical liquid layers 4. The electrodes 6 are laid out in a sandwich arrangement such that liquid is sandwiched between a top and bottom electrode and the liquid so sandwiched can be switched. Each pair of top and bottom electrodes 6 is connected to an electrical power source 11 such that each pair is independently addressable. As a result, the stacked liquid cell 1 comprises a stack of mutually independently addressable sub-cells 8 and pixels 12. The function of the top liquid layer may be for example to selectively display a red color and the function of the bottom layer to display a green color thus producing a multi-color display cell or a full-color display if the stacked liquid cell 1 includes a further sub-cell capable of displaying blue.

Each sub-cell 8 may be manufactured in the conventional manner of forming an empty sub-cell formed from two opposed substrate layers glued together which is then filled with liquid to form a liquid layer. The sub-cells are then stacked to form the stacked display cell. This conventional method of (sub)-cell making requires the use of self-supporting substrates which implies that they need to be relatively thick, say a thickness in the millimeter range, typically about 0.2 to 0.5 mm or more. This results in a relatively thick stacked liquid cell and a relatively large distance between the liquid layers of the stack 10.

For transmissive, reflective and transflective pixelated devices, the large distance between the liquid layers 4 causes undesirable parallax effects as shown in FIG. 1. The direction of light transmitted or reflected along a normal axis 14 is lined up with the stacking direction of the color of the pixels 12 and in the case of multi-color device, the color perceived will the color produced by the pixels 12 which are directly below each other. However, this color will not always be the color perceived at an off-normal axis 16. If the off-normal angle is large enough, light reflected or transmitted along such axis 16 passes pixels 12 which are not directly above each other giving rise to a different color. The color perception is thus viewing angle dependent.

Embodiments in Accordance with the Invention

Figure 2:
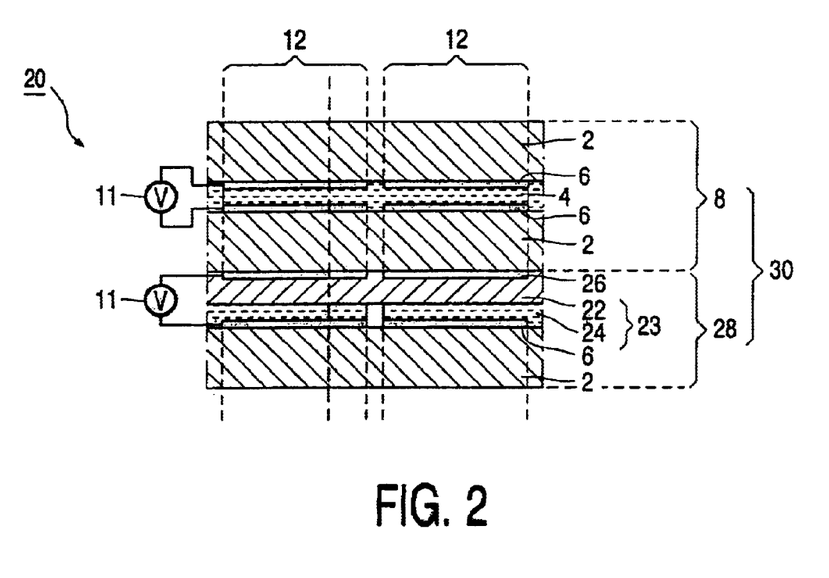
FIG. 2 shows, schematically, a cross-sectional view of a stacked liquid display cell in accordance with the invention.

FIG. 2 shows, schematically, a cross-sectional view of a stacked electro-optical liquid display cell in accordance with the invention. The stacked display cell 20 differs from the prior art device 10 in that the stack 30 of liquid and substrate layers of the stacked liquid cell 20 comprises, instead of a combination of a liquid layer 4 and a conventional adjacent substrate layer, a liquid layer 24 and an adjacent polymeric substrate layer 22 of a stratified-phase-separated composite 23.

Since the polymeric layer 22 of the stratified-phase-separated composite 23 is formed in situ during manufacture of the stacked liquid cell and at the same time as the liquid layer 24 the polymeric layer need not be self supporting and hence can be made much thinner than a conventional substrate layer. The polymeric substrate layer 22 may have a thickness of 100 $\mu$m or less. Typically, even smaller such as 50 $\mu$m or preferably in a range of 5 to 20 $\mu$m.

The polymeric layer being relatively thin, the liquid layers 4 and 24 of sub-cells 8 and 28 respectively are much closer together, typically as much as 0.2 to 0.5 mm. Although this is not very clear by comparing FIGS. 1 and 2 as these figures are not drawn to scale, the resulting reduction in parallax is substantial. After all, consider, at a viewing angle of 45° the reduction of parallax is about 0.2 to 0.5 mm (200 to 500 $\mu$m) in directions normal to the axis 14. A typical pixel width is 10 to 500 $\mu$m, so the reduction is at least the order of a pixel.

Apart from the manufacture of the stratified-phase-separated composite 23, the method of manufacture of the stacked liquid cell is conventional and known as such. The stacked liquid cell 30 may be manufactured by first providing a conventional self-supporting substrate layer 2 (the substrate 2 of sub-cell 28), with electrodes 6.

Subsequently, the stratified-phase-separated composite 23 is formed. This is achieved by first forming a layer of stratified-phase-separable material on the substrate, and then stratifying the stratified-phase-separable material to form the stratified-phase-separated composite 23. Since this method of manufacturing the stratified-phase-separated composite involves the use of only one substrate the method is also referred to as the single-substrate method.

Alternatively, the stratified-phase-separated composite may be formed between two conventional self-supporting substrates, also referred to as the double substrate method, but this is not preferred as it entails removing the conventional substrate adjacent the polymeric layer after stratification in order the achieve the reduction in thickness the present invention aims for.

From a manufacturing point of view it is convenient to provide the top electrode layer 6 needed to switch the liquid layer 22 after the polymeric layer 22 is formed and on top thereof. It is preferred to deposit the top electrode layer 6 by means of wet deposition method such as coating or printing method. Preferred electrode materials which may be provided using such methods include conducting polymers such as poly-3,4-ethylenedioxythiophene and silver pastes. Further details regarding electrode layers provided on top of stratified-phase-separated composites are described in EP application having application number 01204081.2.

With the top electrode layer adjacent the polymeric layer 24 in place, the sub-cell 28 is complete. It may be attached to a separately manufactured conventional cell 8 to form the complete stack 30.

Figure 3:
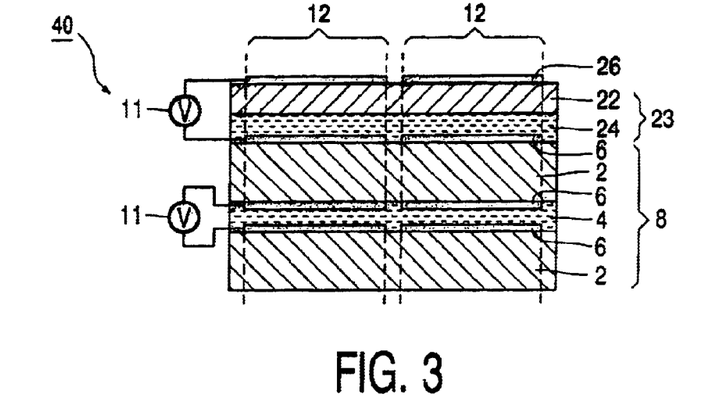
FIG. 3 shows, schematically, a cross-sectional view of a second stacked liquid display cell in accordance with the invention.

FIG. 3 shows, schematically, a cross-sectional view of a second stacked liquid display cell in accordance with the invention.

The stacked liquid cell 40 differs slightly form the stacked liquid cell 20 of FIG. 2 in that the order of the liquid layer 24 and the polymeric layer 22 has been reversed. In doing so, the thickness of the stacked liquid cell may be further reduced while keeping the reduction in parallax because the stacked liquid cell 40 contains one conventional substrate layer less than the stacked liquid cell 20. Manufacture facilitated by preparing a conventional sub-cell 8 which is then used as the substrate onto which a stratified-phase-separated composite is provided using the single-substrate method described above.

Figure 4:
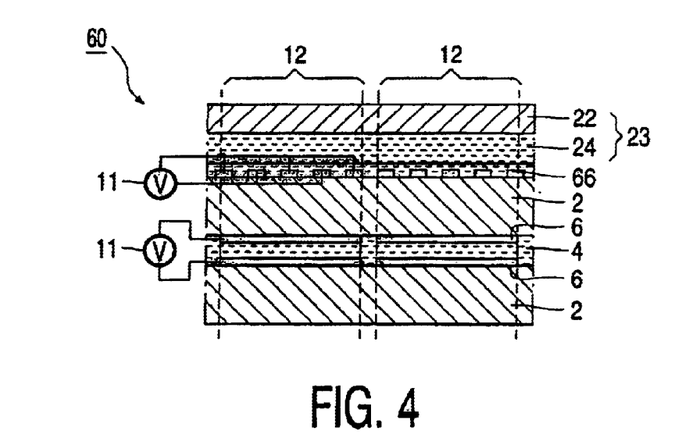
FIG. 4 shows, schematically, a cross-sectional view of a third stacked liquid display cell in accordance with the invention.

FIG. 4 shows, schematically, a cross-sectional view of a third stacked liquid display cell in accordance with the invention.

The stacked liquid cell 60 differs from the stacked liquid cell 40 in the electrode arrangement. The stacked liquid cell 60 has an in-plane switching electrode layer 66 comprising independently addressable electrode pairs, each pair of electrodes being interdigitated. An advantage of this in-plane switching arrangement is that the electrodes are in direct contact with the liquid layer they are arranged to switch. This is in contrast with the sandwich arrangement shown in FIG. 3 in which the top electrode layer 6 is separated from the liquid layer by the polymeric layer 22. The in-plane switching arrangement reduces dielectric losses and avoids voltage drop across non-functional layers. Further, since all electrodes needed to switch the liquid layer are located on a conventional substrate 2, the range of electrode materials which may be suitably used to form the electrode is increased. In particular, it is possible to use indium tin oxide (ITO) electrodes. For in plane-switching a different LC is required. Suitable LC effects and compositions to achieve such effects are well known in the art and details regarding such are described in EP application having application number 01204081.2.

Figure 5:
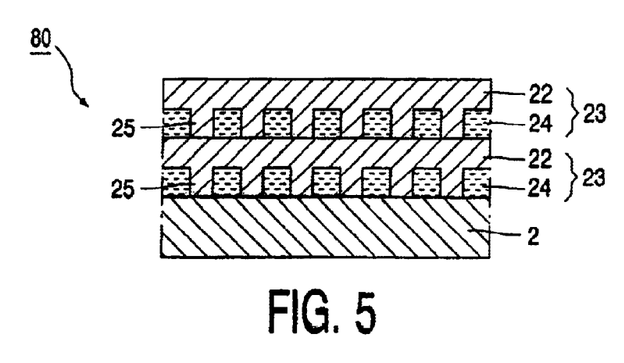
FIG. 5 shows, schematically, a cross-sectional view of a fourth stacked liquid display cell in accordance with the invention.

FIG. 5 shows, schematically, a cross-sectional view of a fourth stacked liquid display cell in accordance with the invention. FIG. 5 shows a stacked liquid cell 80 comprising, in order to further reduce the thickness and/or parallax, two stratified-phase-separated composites each comprising a liquid layer 24 and a polymeric layer 22 which alternate in sequence. This stack may be completely built via a bottom up process in which each preceding stratified-phase-separated composite serves as a substrate for the provision of the next stratified-phase-separated composite. The stratified-phase-separated composites of this embodiment each comprise separating or supporting members 25 to enhance the mechanical integrity of the stack or to maintain a constant liquid layer thickness throughout the liquid layer. The supporting members 25 may also help to improve stratification. Each of the stratified-phase-separated composites may be manufactured by providing a layer of a photopolymerizable stratified-phase-separable material on its appropriate substrate, pattern-wise irradiate the layer to form the supporting members 25 and then further irradiate the sample by means of a flood exposure to induce stratification of the remaining stratified-phase-separable material to form the liquid layer and the polymeric layer. Of course, the separating members 25 may also be provided in the stratified-phase-separated composite of the embodiments shown in the previous figures.

Figure 6:
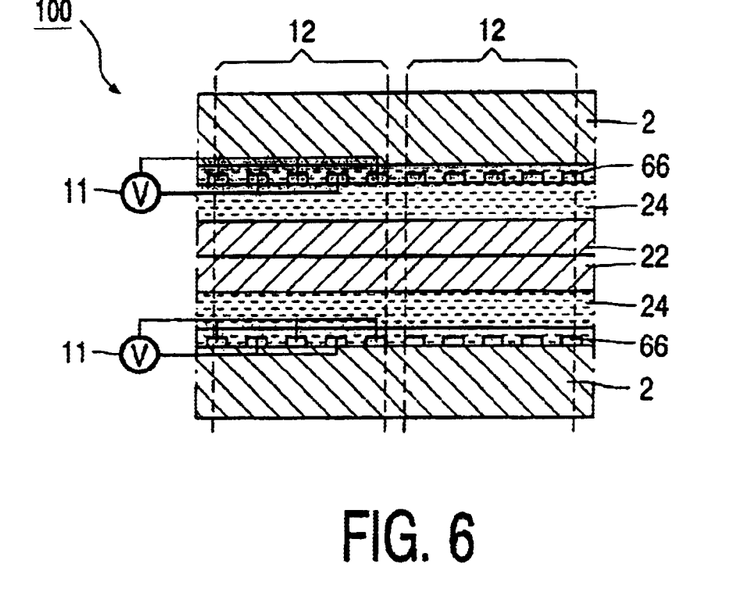
FIG. 6 shows, schematically, a cross-sectional view of a fifth stacked liquid display cell in accordance with the invention.

FIG. 6 shows, schematically, a cross-sectional view of a fifth stacked liquid display cell in accordance with the invention. FIG. 6 shows a stacked liquid cell 100 having a further reduced thickness and parallax by inclusion of two stratified-phase-separated composites having polymeric layers 22 which are stacked back to back. This arrangement has the advantage that robust conventional substrates 2 are located are exterior sides of the stacked liquid cell thus improving mechanical rigidity and ruggedness of the cell 100. If both sub-cells are combined with in-plane switching layers 66 as is shown in FIG. 6 all electrodes can be provided on a conventional substrates which enlarges the range of electrode materials which may be suitably used to form the electrodes. In particular, it allows ITO to be used. The stacked liquid cell 100 is conveniently manufactured by manufacturing two sub-cells separately using the single-substrate method and then combining the sub-cells with the polymeric layers 22 facing each other.

Figure 7:
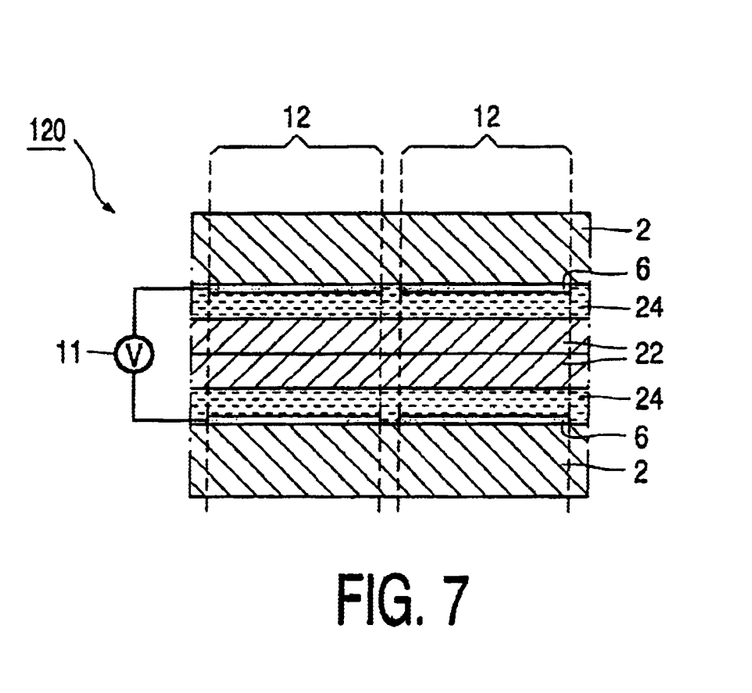
FIG. 7 shows, schematically, a cross-sectional view of a sixth stacked liquid display cell in accordance with the invention.

FIG. 7 shows, schematically, a cross-sectional view of a sixth stacked liquid display cell in accordance with the invention. The stacked liquid cell 120 shown in FIG. 7 is a modification of the cell 100 in that the in-plane switching layers 66 have been replaced with electrode layers 6 to form a sandwich electrode arrangement wherein the sandwich includes more than one or in fact all liquid layers 24. Because a stratified-phase-separated composite is used, the substrate of the polymeric layers 22 separating the liquid layers 24 separating is still relatively thin, eg 1 to 20 $\mu$m, and thus the distance between the top and bottom electrodes 6 is still relatively small. Although in this embodiment the stacked layers are not independently addressable but are addressable in concert this embodiment may also have useful applications. In particular if the liquid layers have a different function. For example, it may be used for sub-pixelation in which each of the liquid layers has the same composition but is oriented differently to reduce viewing angle dependencies. Liquid crystal layers having different thresholds or frequency behavior may be used to obtain dual switching modes. In another embodiment, the first sandwiched liquid layer serves as an electro-switchable auxiliary layer for the second sandwiched liquid layer.

Although each of the liquid layers of the embodiments shown in FIGS. 2 to 7 has an electrode layer associated with it this is by no means essential for the invention. Liquid layers which are not electro-optical may also be used to advantage. An example of that is the use of a liquid compensation layer for improving the viewing angle dependency of a liquid crystal layer such as a (super) twisted nematic liquid crystal layer.

Stacked liquid display cells, and stacked LC display cells in particular, come in a large number of varieties each having particular advantages over single-cell display cells. Some particular embodiments are described hereinbelow.

In a first embodiment of such a stacked display cell, the display cell is a red green and blue emitting (RGB) display cell in which three independently addressable electro-optical liquid layers are stacked, each layer dedicated to display one primary color. The advantage of such an arrangement is a factor of three gain in active display area and thus brightness compared to a single cell arrangement where RGB colors are generated in triplets of adjacently arranged pixels. Cholesteric LC layers having different pitches to switch color-selectively red green and blue, known in the art as such, may be used to implement such a stacked display. Alternatively, switchable guest-host LC containing dyes to generate red green an blue may be used. Generation of red green and blue may also be achieved by using three independently switchable LC layers in combination with retardation layers, the retardation of which is selected to obtain a stack capable of displaying red green and blue.

A second embodiment of a stacked display cell has an electro-optical liquid crystal layer and a further liquid layer serving as a compensation layer for the electro-optical liquid crystal layer. Compensation layers are as such well known in the art and serve to improve the color perception as a function of viewing angle and other viewing angle dependent properties which originate from the use of an electro-optical liquid crystal layer. Since the LC layer and compensation layer are liquid layers the temperature dependence of the LC and compensation property is expected to be similar and consequently the performance of the compensation layer is substantially the same in a large range of temperatures. This is of particular relevance in (super) twisted nematic cells where compensation layers are essential to achieve good color performance and viewing angle dependence.

Stacking independently addressable liquid crystal layers is also an attractive method to increase the information density a display is capable of displaying given a certain pixel size, for example the number of grey scales that can be displayed, while keeping the resolution of the display the same.

Stacking may also be advantageously applied to liquid crystal cells in which a single pixel within a single layer is capable of displaying a variety of colors. Such single-layer, multi-color cells are known in the art but it is has proven difficult to realize grey scales with such a cell. By adding a further independently addressable electro-active layer grey scale functionality may be introduced.

Also, a stacked liquid cell may be used to provide depth to an image.

An example of a liquid cell, in particular a liquid crystal cell, manufactured in accordance with the single substrate method is as follows:

A stratified-phase-separable composition is provided having the following composition:
50 wt % liquid crystal material E7,
44.5 wt % photo-polymerizable isobornylmethacrylate (A1)
0.5 wt % photo-initiator Irgacure 651 (A2) and
5.0 wt % light-absorbing photo-polymerizable 4,4'-di-(6-methacryloyloxyhexyloxy)-3-methylstilbene (A3).

For details regarding chemical structure and synthesis reference is made to synsthesis European patent application having application number 00204529.2.

A glass substrate which carries a rubbed polyimide alignment layer for orienting the liquid crystal material E7 is provided. The substrate has a thickness of about 1.1 mm. There is no particular reason for the substrate to have this thickness. Thinner conventional substrates of glass or plastic with thicknesses down to 0.4 mm may also be used. The thickness of the alignment layer is estimated to be about 100 to 200 nm. A 10 $\mu$m film of the said stratified-phase-separable composition is coated on the glass substrate using a blade coating apparatus at room temperature. The film 3 thus formed is then exposed to UV light (lamp type: Philips TL-08, 0.5 mW/cm$^2$) for 15 minutes at a temperature of 60° C. Upon exposure to said UV light, due to the presence of the light absorbing compound A3, a light intensity gradient is set up in the direction normal to the substrate. The light intensity being highest near the top of the film, polymerization selectively occurs in the near the film/air interface. The polymer formed upon UV exposure is not miscible with the liquid crystal material E7 and thus phase separates from the liquid crystal material. Under the influence of the the light intensity gradient provided by the UV flood exposure, the phase separation proceeds in the form of a stratification process in which a distinct polymeric layer is formed on top of the liquid crystal layer of E7, wherein the liquid crystal layer is formed on the substrate side of the polymeric layer. As a result of the intensity gradient, monomeric material A1 is selectively depleted at the top of the film, more in particular at the interface of the liquid crystal layer and polymer layer being formed, as a result of which a diffusion gradient in monomer A1 (and A3) concentration is set up as a result of which monomer material A1 (and A3) is continuously fed to the liquid crystal layer/polymer layer interface which allows the stratification process to proceed further finally resulting in a liquid cell comprising a substrate and a stratified-phase-separated composite comprising an about 5 μm thick polymeric layer of polymerized A1 and A3 monomers and an about 5 μm thick liquid crystal layer of E7.

Of a liquid cell in accordance with the invention thus manufactured, the liquid crystal material is recovered from the stratified phase-separated composite and its transition temperature is measured. The measured transition temperature is the same as that of virgin liquid crystal material E7, which demonstrates that the liquid crystal layer of the stratified-phase-separated composite essentially consists of liquid crystal material E7.

The liquid crystal layer is an electro-optical layer as its reflection/transmission characteristics can be reversibly switched by subjecting the composite to an external electrical field, the electro-optical effect rendered visible by placing the liquid cell between crossed first and second polarizers.

If the stratified-phase-separated composite is aligned such that the rubbing direction of the polyimide layer makes an angle of 45° with the polar axis of each of the two polars, the liquid crystal cell has a maximal transmission indicating that the liquid crystal layer LC molecules have a more or less planar alignment. With the LC cell sandwiched between electrodes and a suitable voltage applied, the LC cell turns dark indicating that LC molecules adopt a homeotropic alignment in which case the light polarized by the first polarizer incident on the LC layer does not experience birefringence as a consequence of which the polarization direction of the incident light is not changed and hence absorbed by the second polarizer. After removal of the voltage the cell turns bright again. This process can be repeated over and again

What is claimed is:

1. A stacked liquid cell comprising
a stack of at least two self-supporting layers,
wherein each self-supporting layer includes a self-supporting substrate, a liquid layer, and another layer that encapsulates the liquid layer with the self-supporting substrate, and
the another layer of at least one of the self-supporting layers includes a polymeric layer of a stratified-phase-separated composite.

2. A stacked liquid cell as claimed in claim 1, wherein the thickness of the polymeric layer is 10 μm or less.

3. A stacked liquid cell as claimed in claim 1, wherein the stratified-phase-separated composite is obtained by photo-polymerizing a photo-polymerizable stratified-phase-separable composition.

4. A stacked liquid cell as claimed in claim 3, wherein the liquid layer of the stratified-phase-separated composite comprises supporting members extending from the polymeric layer to the substrate opposite the polymeric layer,
the supporting members being obtained by pattern-wise photo-polymerizing stratified-phase-separable composition.

5. A stacked liquid cell as claimed in claim 1, wherein at least one of the liquid layers is an electro-optical liquid crystal layer.

6. A stacked liquid cell as claimed in claim 1, the stack comprising adjacent stratified-phase-separated composites stacked such that the liquid and the polymeric layers alternate in sequence.

7. A stacked liquid cell as claimed in claim 1, wherein the stack comprises adjacent stratified-phase-separated composites of which the polymeric layers are stacked back to back.

8. The stacked liquid cell of claim 1, further including a conductive layer corresponding to an in-plane set of conductors that control the transmissive/reflective characteristics of at least one of the liquid layers.

9. The stacked liquid cell of claim 1, further including a pair of conductive layers that control the transmissive/reflective characteristics of a plurality of liquid layers.

10. The stacked liquid cell of claim 9, wherein at least one of the layers of the plurality of liquid layers has a different orientation than another layer of the plurality of liquid layers.

11. The stacked liquid cell of claim 9, wherein at least one of the layers of the plurality of liquid layers differs from another layer of the plurality of layers with respect to at least one of threshold and frequency behavior.

12. The stacked liquid cell of claim 1, wherein at least one of the liquid layers is an auxiliary layer that modifies an effect of at least one other of the liquid layers.

13. The stacked liquid cell of claim 1, wherein at least one of the liquid layers is configured to provide gray scale functionality.

14. The stacked liquid cell of claim 1, wherein at least two of the liquid layers are configured to provide depth to an image.

15. The stacked liquid cell of claim 1, further including at least two conductors within the at least two self-supporting layers,
and wherein the two conductors control the at least two liquid layers and at least one of the two liquid layers is configured to provide visual compensation.

16. A method of manufacturing a stacked liquid cell, the method comprising:
providing a first self-supporting substrate layer;
applying a layer of stratified-phase-separable composition on the first self-supporting substrate layer;
stratifying the stratified-phase-separable composition to form a stratified-phase-separated composite comprising a liquid layer and a polymeric layer, the liquid layer being formed on the first self-supporting substrate layer to form a first self-supporting element;
providing a second self-supporting element that includes at least one liquid layer formed on a second self-supporting substrate layer; and
combining the second self-supporting element with the first self-supporting element.

17. The method of claim 16, wherein combining the self-supporting elements includes combining adjacent stratified-phase-separated composites of two self-supporting layers such that the polymeric layers are stacked back to back.

18. The method of claim 17, further including providing a conductive layer on each of the self-supporting substrate layers,
wherein these conductive layers are configured as a pair of control electrodes that provide control of a transmissive/reflective characteristic of each of the liquid layers between these conductive layers.

19. The method of claim 16, further including providing a conductive layer within at least one of the self-supporting layers,
the conductive layer corresponding to an in-plane set of conductors that control the transmissive/reflective characteristics of at least one of the liquid layers.

* * * * *